United States Patent
Imafuku

(10) Patent No.: US 11,838,479 B2
(45) Date of Patent: Dec. 5, 2023

(54) PRINTING SYSTEM COUNTING NUMBER OF PRINTS GENERATED, SERVER SYSTEM, AND CONTROL METHOD OF SERVER SYSTEM

(71) Applicant: CANON KABUSHIKI KAISHA, Tokyo (JP)

(72) Inventor: Kazuya Imafuku, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/844,819

(22) Filed: Jun. 21, 2022

(65) Prior Publication Data
US 2022/0417385 A1 Dec. 29, 2022

(30) Foreign Application Priority Data
Jun. 24, 2021 (JP) .................................. 2021-104840

(51) Int. Cl.
*H04N 1/34* (2006.01)
(52) U.S. Cl.
CPC ............. *H04N 1/346* (2013.01); *H04N 1/344* (2013.01)
(58) Field of Classification Search
None
See application file for complete search history.

(56) References Cited

FOREIGN PATENT DOCUMENTS

| JP | 2004-170811 A | 6/2004 |
|----|---------------|--------|
| JP | 2005-193409 A | 7/2005 |
| JP | 2006-343605 A | 12/2006 |
| JP | 2010-201803 A | 9/2010 |
| JP | 2010-214684 A | 9/2010 |
| JP | 2012-166465 A | 9/2012 |
| JP | 2016-193592 A | 11/2016 |
| JP | 2018-106585 A | 7/2018 |

OTHER PUBLICATIONS

Translation for JP 2012-166465 (Year: 2012).*
Translation for JP 2010-201803 (Year: 2010).*
Translation for JP 2018-106585 (Year: 2018).*
Japanese Office Action dated Nov. 1, 2022, in related Japanese Patent Application No. 2021-104840 (with English translation).

\* cited by examiner

*Primary Examiner* — Lennin R RodriguezGonzalez
(74) *Attorney, Agent, or Firm* — VENABLE LLP

(57) ABSTRACT

A printing system includes a printing apparatus and a server system to receive a processing result of processing performed by the printing apparatus. The printing apparatus notifies the server system of the processing result, which includes a plurality of types of counts that indicate the number of prints generated by execution of print processing in the printing apparatus and that concurrently count up under predetermined conditions, and the server system provides a service based on the plurality of types of counts included in the processing result. In addition, the processing unit provides the service based on counts which are a combination of at least two types of counts from among the plurality of types of counts, and the combination of the types of counts is set in advance in association with the service.

12 Claims, 12 Drawing Sheets

PRINTING SYSTEM COUNTING NUMBER OF PRINTS GENERATED, SERVER SYSTEM, AND CONTROL METHOD OF SERVER SYSTEM

This application claims the benefit of Japanese Patent Application No. 2021-104840, filed Jun. 24, 2021, which is hereby incorporated by reference herein in its entirety.

BACKGROUND OF THE INVENTION

Field of the Invention

The present disclosure relates to a technique for providing a service according to the number of prints of a printing apparatus.

Description of the Related Art

There is what is termed as a pay-as-you-go service, which is a service according to the number of prints of a printing apparatus. For example, there are services such as a charging service for charging a fee for a user according to the number of prints of a printing apparatus and a point-granting service for granting a return to a user according to the usage amount of a printing apparatus.

In Japanese Patent Laid-Open No. 2004-170811 (hereinafter referred to as Document 1), a technique that enables a user to change the setting of the charging method after the shipping of the product is described. Specifically, a printing apparatus that allows the user to selectively choose and change the setting between the method of determining the counting of the number of prints according to the number of printed faces and the method of determining the counting according to the number of output sheets is described.

However, in Document 1, the number of prints to be counted corresponds to only one counting type that is based on the user's choice. Therefore, it is not possible to attend to various services according to the numbers of prints.

SUMMARY OF THE INVENTION

The printing system according to an embodiment of the present disclosure is a printing system including a printing apparatus and a server system configured to receive a processing result of processing performed by the printing apparatus, wherein the printing apparatus includes a notification unit configured to notify the server system of the processing result, which includes a plurality of types of counts that indicate the number of prints generated by execution of print processing in the printing apparatus and that concurrently count up under predetermined conditions, and wherein the server system includes a processing unit configured to provide a service based on the plurality of types of counts included in the processing result.

Further features of the present invention will become apparent from the following description of exemplary embodiments with reference to the attached drawings.

DESCRIPTION OF THE EMBODIMENTS

Hereinafter, preferred embodiments of the present disclosure will be explained in detail with reference to the accompanying drawings. The following embodiments are not intended to limit the contents of the present disclosure, and every combination of the characteristics explained in the present embodiments is not necessarily essential to the solution in the present disclosure.

First Embodiment

In the present embodiment, a system utilizing a cloud computing environment so as to be applicable to various pay-as-you-go services according to the usage amount of a printing apparatus will be explained. There are various scales for the usage amount of the printing apparatus to be used for pay-as-you-go services. For example, the amount of ink or sheets consumed in printing can be a scale of the usage amount. Alternatively, the occupation time of the printing apparatus is also one of the scales of the usage amount.

Even in a case where the same scale is used, how the scale is used differs depending on the purpose of the service. For example, in a case of a charging service, if charging is performed in a case where an error such as a paper jam occurs and a preferable print result cannot be obtained, the user suffers a disadvantage. Therefore, there is a service form in which the charging amount is determined according to the amount of the deliverable whose printing has been normally completed or the consumables consumed for generating the deliverable. On the other hand, in a case of a point-granting service, the user's sheets and ink are consumed even if a paper jam occurs. Therefore, there is also a service form in which points are granted regardless of the success or failure of printing.

In the present embodiment, the printing apparatus counts multiple types of usage amounts of the printing apparatus and transmits the usage amounts to a server in order to attend to various service forms. Further, on the server side that provides services, the usage amount that is suitable for the service being implemented is selected from among the multiple types of usage amounts and utilized, or multiple types of usage amounts are combined and utilized. In the embodiments explained below, an explanation will be given of the example in which processing is performed with the printing apparatus counting the number of prints under multiple conditions and with the server selecting a count value from among multiple count values or combining multiple count values according to the service.

System Configuration

Figure 1:
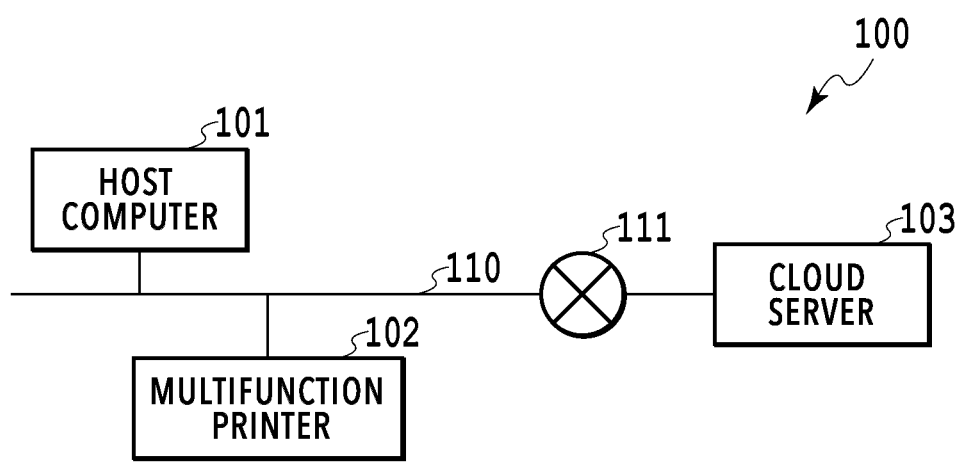
FIG. 1 is a diagram illustrating an example of an overall configuration of a printing system.

FIG. 1 is a diagram illustrating an example of the overall configuration of the printing system in the present embodiment. The printing system 100 of the present embodiment includes the host computer 101, the multifunction printer (hereinafter referred to as MFP) 102, and the cloud server 103. The host computer 101 and the MFP 102 installed in the user environment are connected to each other via the local area network (hereinafter referred to as LAN) 110.

The LAN 110 is connected to the cloud server 103 (an example of an information processing apparatus), which includes one or more servers, via the Internet 111. That is, the user environment having the host computer 101 and the MFP 102 (an example of the printing apparatus) and the cloud environment where the cloud server 103 is arranged are connected via the Internet 111.

Hardware Configuration

Figure 2:
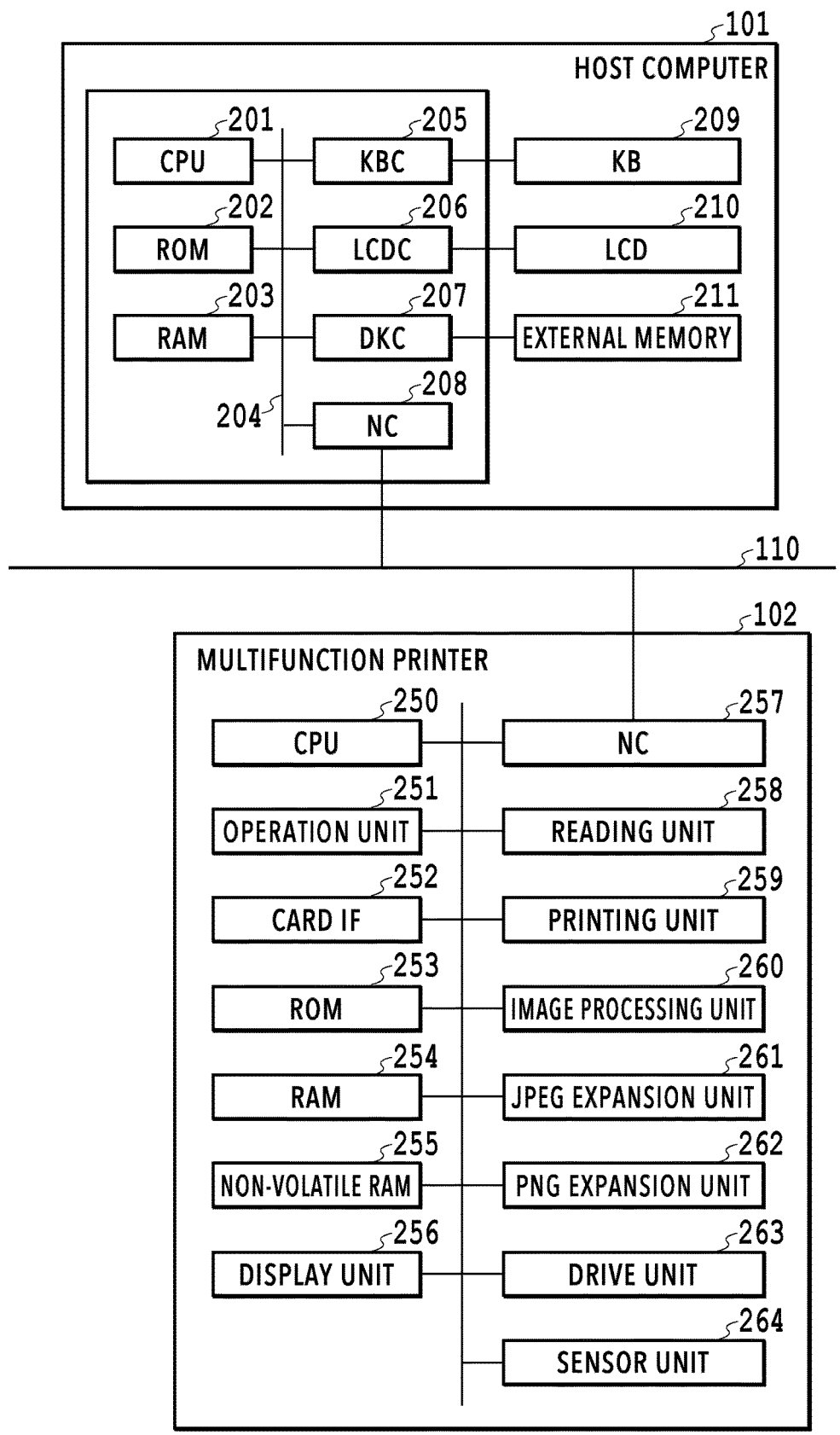
FIG. 2 is a block diagram illustrating an example of a configuration on a user environment side.

FIG. 2 is a block diagram illustrating an example of the configuration on the user environment side of the printing system 100 in the present embodiment. That is, FIG. 2 is a diagram illustrating an example of the hardware configuration of the host computer 101 and the MFP 102.

The host computer 101 includes the CPU 201, the ROM 202, the RAM 203, the system bus 204, the keyboard controller (KBC) 205, the LCD controller (LCDC) 206, and the disk controller (DKC) 207. Further, the network controller (NC) 208, the keyboard (KB) 209, the LCD 210, and the external memory 211 are included.

The host computer 101 stores an application program, a printer control command generation program, etc., in the ROM 202 or the external memory 211 illustrated in FIG. 2. Based on these programs, the CPU 201 executes a process of creating document data, which can include a figure, an image, a character, a table, or the like, and a process of generating print job data of document data. Further, the CPU 201 comprehensively controls each device connected to the system bus 204.

An operating system program or the like, which is a control program of the CPU 201, is stored in the ROM 202 or the external memory 211. Various kinds of data including font data to be used in the process of generating print job data of document data are stored in the ROM 202 or the external memory 211. The RAM 203 functions as a main memory, a work area, or the like, of the CPU 201.

The keyboard controller (KBC) 205, the LCD controller (LCDC) 206, the disk controller (DKC) 207, and the network controller (NC) 208 are connected to the system bus 204. The disk controller (DKC) 207 controls the access to the external memory 211 such as a hard disk (HD) or the like, which stores a boot program, various kinds of applications, a printer control command generation program (hereinafter referred to as a printer driver), etc. The network controller (NC) 208 is connected to the MFP 102 and the cloud server 103 via a network and executes a process of controlling communication with the MFP 102 and the cloud server 103.

The CPU 201 opens various registered windows and executes various data processing, based on an instruction of a command provided by a mouse cursor or the like (not illustrated in the drawings) on the LCD 210. For executing printing, the user can open a window related to print settings to perform the settings of the MFP 102.

Next, the configuration of the MFP 102 will be explained. The MFP 102 includes the CPU 250, the operation unit 251, the card interface (card IF) 252, the ROM 253, the RAM 254, the non-volatile RAM 255, the display unit 256, the network controller (NC) 257, the reading unit 258, and the printing unit 259. Further, the image processing unit 260, the JPEG expansion unit 261, the PNG expansion unit 262, the drive unit 263, and the sensor unit 264 are included.

The ROM 253 stores a control command program of the MFP 102. The CPU 250 executes a program stored in the ROM 253 and controls various functions included in the MFP 102. For example, the CPU 250 displays a menu of the functions that the MFP 102 provides to the user on the display unit 256 and accepts an operation of the user via the operation unit 251. Further, the CPU 250 can control the reading unit 258 and the printing unit 259 to provide a copying function to the user.

The network controller (NC) 257 is connected to the host computer 101 and the cloud server 103 via a network and executes a process of controlling communication with the host computer 101 and the cloud server 103. The MFP 102 can receive image data and job data from other devices with the RAM 254 by use of the network controller (NC) 257. Alternatively, the MFP 102 can also read out image data from a memory card, which is connected to the MFP 102 by the user, to the RAM 254 by use of the card IF 252.

The JPEG expansion unit 261 can read image data compressed in the JPEG format from the RAM 254 and perform writing to the RAM 254 after decoding the image data into an RGB point-sequential image. Similarly, the PNG expansion unit 262 can read image data compressed in the PNG (Portable Network Graphics) format from the RAM 254 and performs writing to the RAM 254 after decoding.

The image processing unit 260 is a functional unit that performs various kinds of image processing on image data that is output in the expansion processes corresponding to various kinds of image data formats. For example, the image processing unit 260 performs image processing such as image analysis, calculation of conversion characteristics, conversion from a luminance signal (RGB) to a density signal (CMYK), scaling, gamma conversion, and error diffusion. Further, the image data to which these image processing have been performed is stored in the RAM 254.

If the image data received by the RAM 254 is JPEG or PNG, the expansion processes corresponding to various kinds of image data formats refer to the process performed by the JPEG expansion unit 261 or PNG expansion unit 262 corresponding thereto, respectively. For other image data formats, the expansion processes refer to the image expansion process executed by the CPU 250 based on a program stored in the ROM 253.

If the data stored in the RAM 254 reaches a predetermined data amount, the printing operation will be executed by the printing unit 259. The printing unit 259 is configured with an inkjet head of an inkjet scheme, a general-purpose IC, etc. The printing unit 259 reads out image data stored in the RAM 254 under the control of the CPU 250 and outputs a printed product in cooperation with the drive unit 263 and the sensor unit 264.

Figure 3:
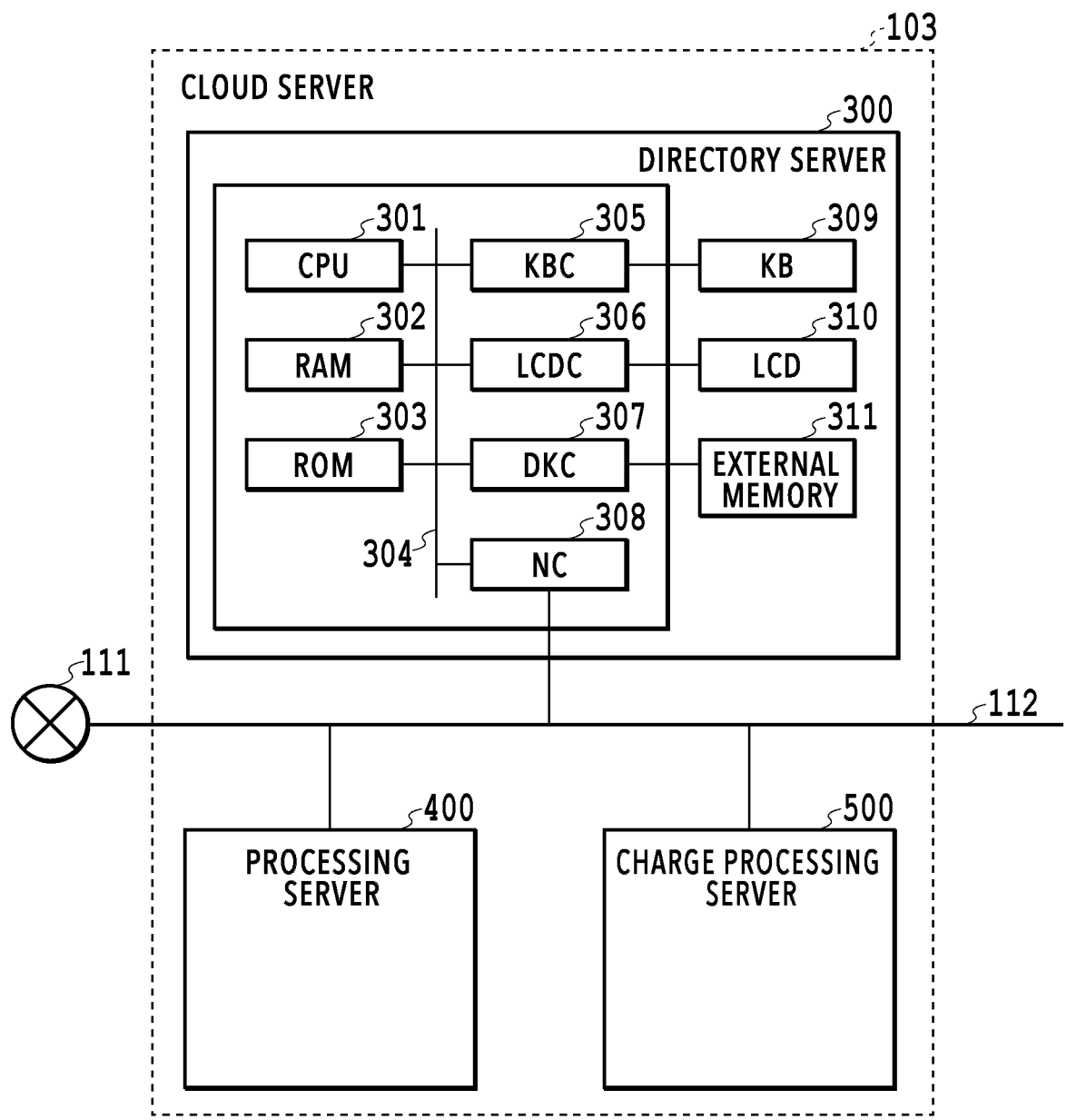
FIG. 3 is a hardware configuration diagram illustrating an example of a configuration on a cloud server side.

FIG. 3 is a hardware configuration diagram illustrating an example of the configuration on the cloud server 103 side of the printing system 100 in the present embodiment. The cloud server 103 of the present embodiment is a server system including the directory server 300, the processing server 400, and the charge processing server 500. Further, these servers are connected via the network 112. That is, the cloud server 103 represents a server system that collectively refers to multiple servers that implement respective functions. Although the directory server 300, the processing server 400, and the charge processing server 500 are illustrated as examples in FIG. 3, these may be configured with one server or with multiple servers which implement further segmented functions. Further, although the one processing server 400 is illustrated in FIG. 3, it is also possible that multiple processing servers 400 are installed depending on the processing performed on the cloud side.

The directory server 300 has a function of accepting job data from the host computer 101. The processing server 400 has a function of performing processing according to the settings designated for the job in job data. The charge processing server 500 has a function of performing charge processing according to print processing executed by the MFP 102.

In FIG. 3, the hardware configuration of each server can be basically the same. In FIG. 3, the configuration of the directory server 300 is illustrated as a representative. The directory server 300 includes the CPU 301, the RAM 302, the ROM 303, the keyboard controller (KBC) 305, the LCD controller (LCDC) 306, and the disk controller (DKC) 307. Further, the network controller (NC) 308, the keyboard (KB) 309, the LCD 310, and the external memory 311 are included.

The directory server 300 uses the CPU 301 to execute a process of distributing received job data to the processing server 400, based on a job reception program or the like which is stored in the ROM 303 or the external memory 311. Further, the directory server 300 uses the CPU 301 to control each device connected to the system bus 304. An operating system program or the like, which is a control program of the CPU 301, is stored in the ROM 303 or the external memory 311. Various kinds of data to be used for performing job distribution processing or the like are stored in the ROM 303 or the external memory 311. The RAM 302 functions as a main memory, work area, etc., of the CPU 301.

The keyboard controller (KBC) 305, the LCD controller (LCDC) 306, the disk controller (DKC) 307, and the network controller (NC) 308 are connected to the system bus 304. The keyboard controller (KBC) 305 controls input of keys from the keyboard (KB) 309 or a pointing device, which is not illustrated in the drawings. The LCD controller (LCDC) 306 controls the display of the LCD display (LCD) 310. The disk controller (DKC) 307 controls the access to the external memory 311 such as a hard disk (HD) that stores a boot program, various kinds of applications, a user file, an edition file, or the like.

The network controller (NC) 308 receives job data from the host computer 101 or the MFP 102 via a network. Further, the network controller (NC) 308 is connected to the processing server 400 and the charge processing server 500 via the network and executes a process of controlling communication with the processing server 400 and the charge processing server 500.

The hardware configuration of the processing server 400 and the charge processing server 500 is almost the same as that of the directory server 300. The difference is that, regarding the processing server 400, the programs for processing are stored in the ROM or the external memory of the processing server 400. Similarly, regarding the charge processing server 500, the programs for the charge processing are stored in the ROM or the external memory of the charge processing server 500.

Software Configuration

Figure 4:
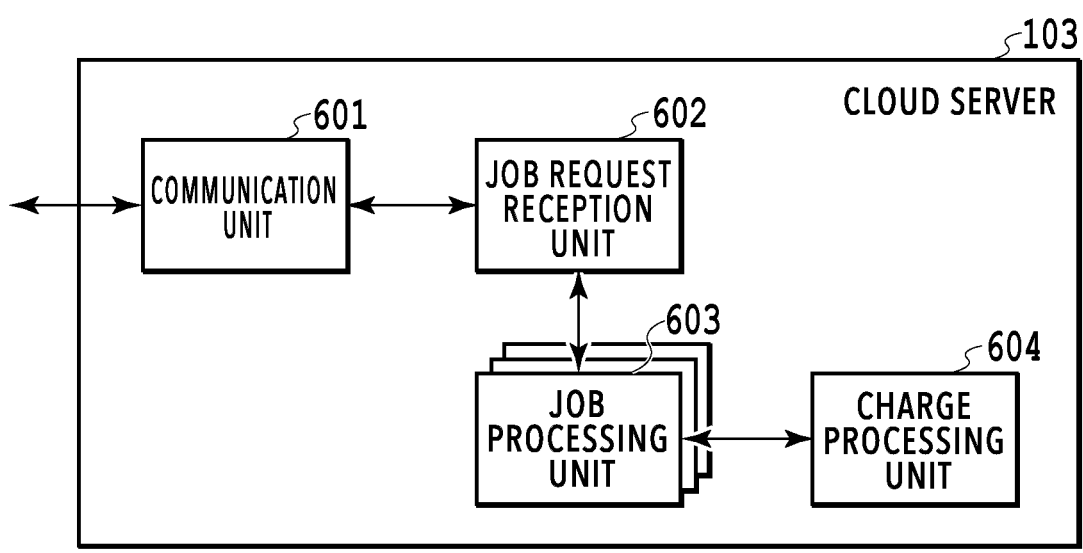
FIG. 4 is a software configuration diagram illustrating an example of a configuration on the cloud server side.

FIG. 4 is a software configuration diagram illustrating an example of the configuration on the cloud server 103 side of the printing system in the present embodiment. FIG. 4 is a configuration diagram in which the roles of the various kinds of servers of FIG. 3 are captured as the one cloud server 103. As described above, the cloud server 103 may be configured with the group of various servers of FIG. 3 or may be configured with one server.

As software modules, the cloud server 103 includes the communication unit 601, the job request reception unit 602, the job processing unit 603, and the charge processing unit 604. Each of these units is realized by the CPU 301 of the server illustrated in FIG. 4 reading out a program stored in the ROM 303 or the external memory 311 into the RAM 302 and executing the program.

The communication unit 601 receives data from the host computer 101 or the MFP 102 and transmits data from the cloud server 103. If accepting job data from the communication unit 601, the job request reception unit 602 analyzes the processing contents of the job data and transmits the job to the corresponding job processing unit 603. Further, if receiving a print completion notification of the MFP 102 from the communication unit 601, the job request reception unit 602 transmits the print completion notification to the job processing unit 603.

The job processing unit 603 has multiple processing units that perform various kinds of processing. The job processing unit 603 performs predetermined processing on the job data received via the communication unit 601 to generate print data and transmits the print data to the communication unit 601. Further, if the print completion notification is received from the job request reception unit 602, the job processing unit 603 notifies the charge processing unit 604 that the processing carried out by the corresponding job processing unit 603 has been completed. If receiving the completion notification of the processing from the job processing unit 603, the charge processing unit 604 executes the charge processing.

Regarding the print completion notification, the print completion notification executed without going through the cloud server 103 is also notified to the cloud server 103. For example, the completion of printing executed between the host computer 101 and the MFP 102 and printing executed only by the MFP 102 are both notified to the cloud server 103. That is, the cloud server 103 sends information of the print completion notification, which includes the printing executed without going through the cloud server 103, to the charge processing unit 604 so that the charge processing will be performed by the charge processing unit 604. That is, the job processing unit 603 includes a job processing unit that processes a print completion notification of printing executed without going through the cloud server 103.

Sequence

Figure 5:
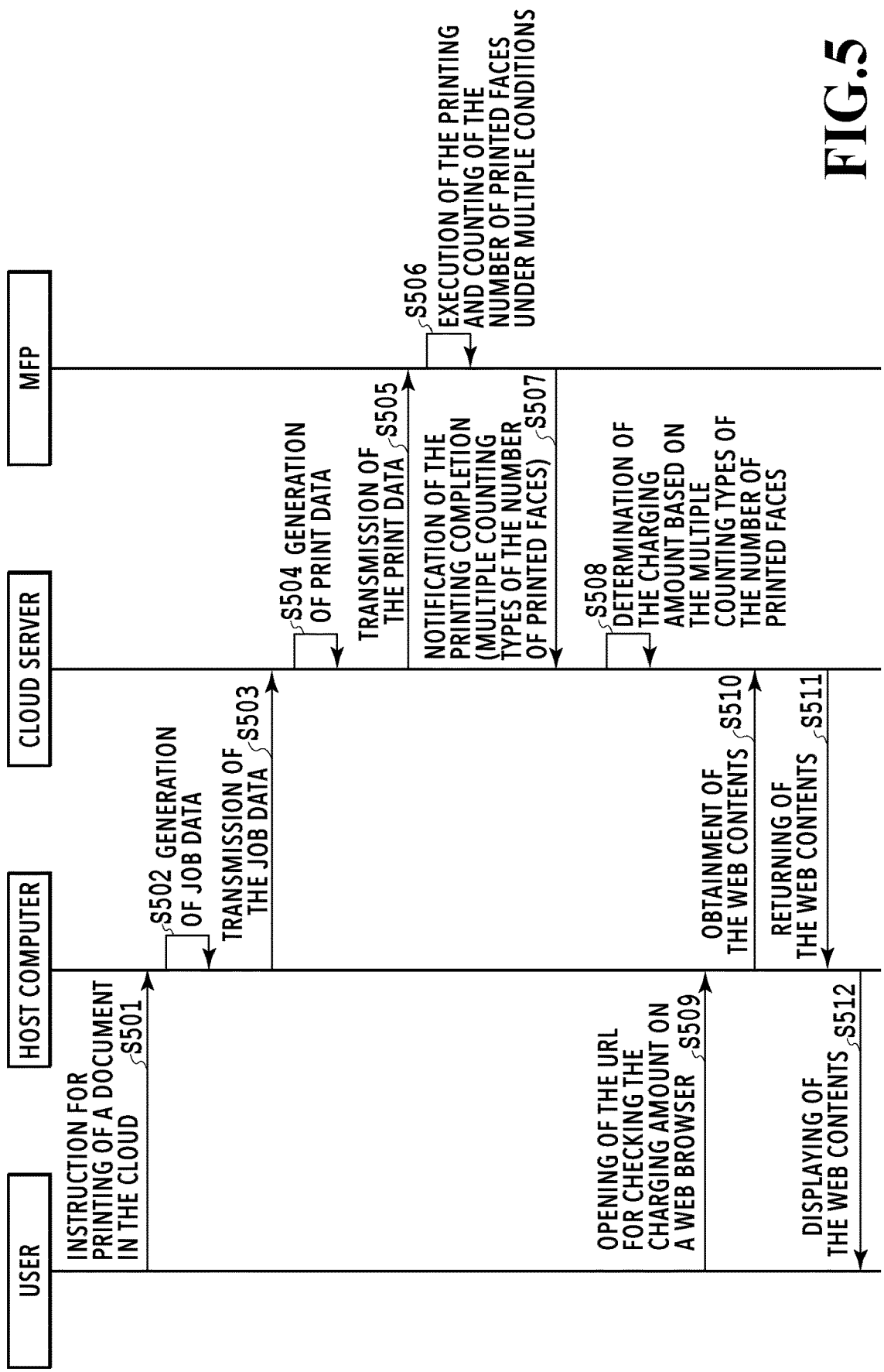
FIG. 5 is a sequence diagram illustrating an example of charge processing for printing.

FIG. 5 is a sequence diagram illustrating an example of the charge processing for printing via the cloud server 103 in the present embodiment. The series of processes illustrated in the sequence of FIG. 5 is executed by each CPU of the host computer 101, the MFP 102, and the cloud server 103. That is, the series of processes is performed by the CPU of each apparatus expanding a program code stored in the ROM or the external memory into the RAM and executing the program code. Alternatively, a part or all of the functions in the steps of FIG. 5 may be implemented by hardware such as an ASIC or an electronic circuit. The symbol "S" in the explanation of each process indicates that it is a step in the sequence diagram. Hereinafter, the subject in each process is the CPU included in the host computer 101, the MFP 102, or the cloud server 103. Further, in order to facilitate the understanding of the explanation, FIG. 5 is a sequence diagram including the user. The above explanation is the same for other sequence diagrams in the present specification.

FIG. 5 is a sequence illustrating the example in which the user instructs the cloud server 103 to print a document saved in the cloud server 103 in advance by use of the host computer 101 so that the MFP 102 executes the printing.

It is assumed that the user has previously registered the information of the cloud server 103 used by the user (storage information of the cloud storage service) in the host computer 101. Further, it is assumed that the host computer 101 communicates with the cloud server 103 in advance based on the registered storage information so that the user can refer to the file names and the previews of the documents owned by the user.

In S501, the host computer 101 accepts an instruction for printing a document saved in the cloud server 103 from the user. In S502, the host computer generates job data in which the print settings designated by user operations, the URL of the document, and the access token for referencing the document are described. In S503, the host computer 101 transmits the generated job data to the cloud server 103.

In S504, the cloud server 103 obtains the document to be printed by use of the URL and the access token described in the job data sent from the host computer 101. Further, print data is generated based on the print settings described in the job data. In S505, the cloud server 103 transmits the generated print data to the MFP 102.

In S506, the MFP 102 executes printing by use of the print data sent from the cloud server 103 and counts the number of printed faces under multiple conditions. A face in the number of printed faces refers to one surface of an output sheet. For example, in a case of double-sided printing, it is possible to print two faces, i.e., the front face and the back face, on one output sheet. That is, in a case of performing double-sided printing so that printing is performed on the front face and the back face, the number of printed faces is counted up by 2. Even in the setting of double-sided printing, in a case where printing is performed only on the front face, the number of printed faces is counted up by 1. Further, even in a case of executing what is termed as the N-in-1 printing function in which multiple pages are allocated to one output sheet, the number of printed faces is counted up based on the number of faces in the output sheets used for printing. In the present embodiment, the number of printed faces is counted by multiple types (multiple conditions). The explanation of the multiple types of counts will be described later.

If the printing is completed, the MFP 102 issues (transmits) a print completion notification, which indicates a processing result including multiple types of count information of the counted number of printed faces, to the cloud server 103 in S507. In S508, the cloud server 103 determines the charging amount based on the multiple types of count information of the number of printed faces, which is included in the print completion notification issued in S507. Then, the cloud server 103 reflects the charging amount in the Web contents for notifying the user of the charging amount. Accordingly, in a case where the user accesses the Web content to check the charging amount, the appropriate charging amount will be presented. The explanation of the determination of the charging amount based on the multiple types of count information of the number of printed faces, which is performed by the cloud server 103, will be described later.

Thereafter, in S509, the host computer 101 accepts an instruction for accessing the URL for checking the charging amount by use of a Web browser from the user. That is, the user inputs an instruction for opening the URL for checking the charging amount to the host computer 101 by use of a Web browser. S509 is executed at a given timing. In S510, the host computer 101 requests the cloud server 103 to obtain the Web contents. In S511, the cloud server 103 returns the Web contents in response to the obtainment request of S510. In S512, the host computer 101 displays the Web contents on the Web browser. Accordingly, the user can check the charging amount via the Web browser of the host computer 101.

The above is the explanation of the processing sequence in what is termed as cloud printing, in which printing of a document stored in a storage of a cloud environment is performed by use of the cloud server 103.

Figure 6:
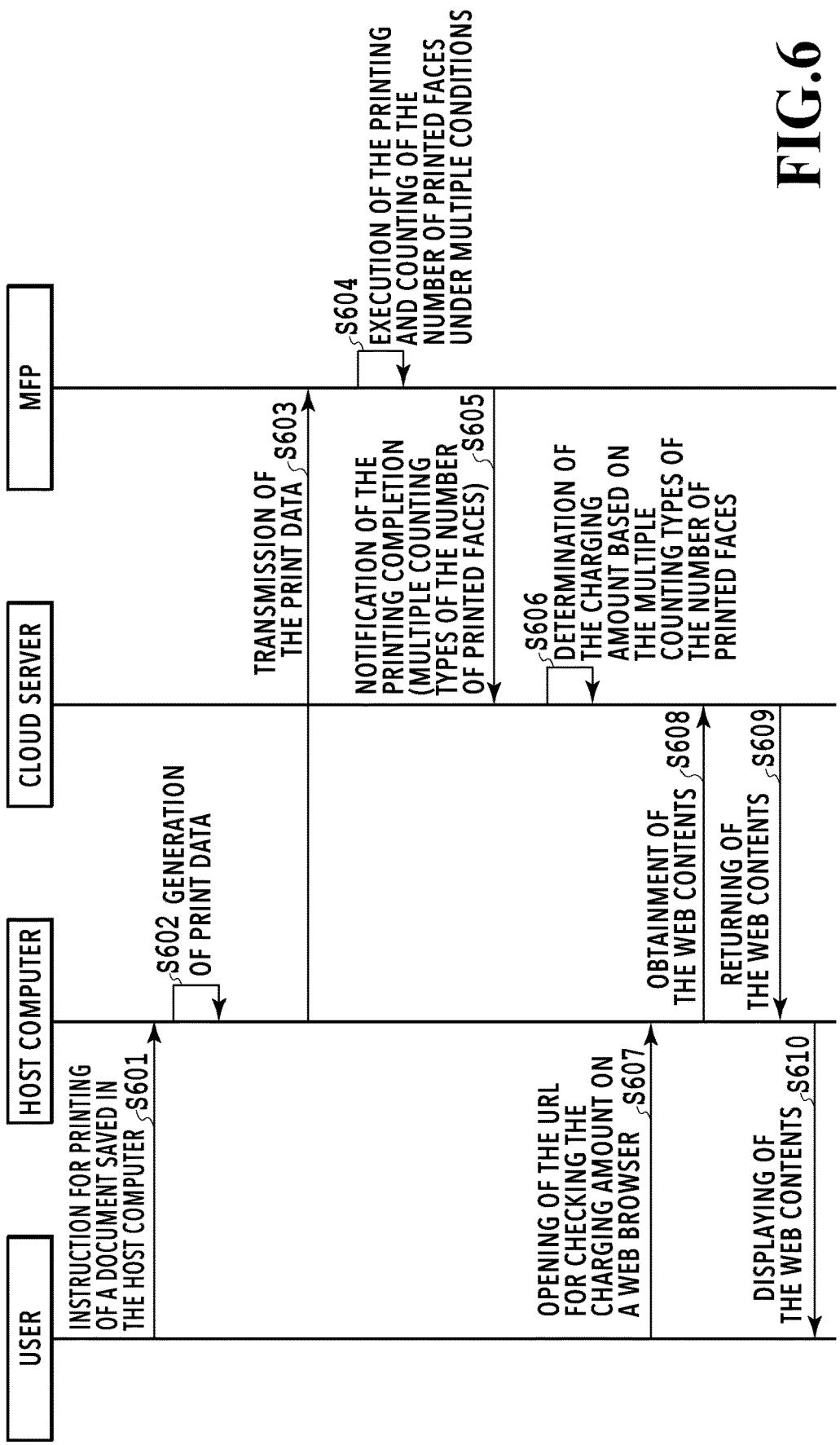
FIG. 6 is a sequence diagram illustrating an example of charge processing for printing.

FIG. 6 is a sequence diagram illustrating an example of charge processing for printing without going through the cloud server 103 in the present embodiment. FIG. 6 is a sequence in a case where the user prints a document saved in the host computer 101 in advance by use of the MFP 102 without going through the cloud server 103.

In S601, the host computer 101 accepts an instruction for printing a document saved in the host computer 101 from the user. In S602, the host computer 101 generates print data based on the print settings and document designated by user operations. In S603, the host computer 101 transmits the generated print data to the MFP 102.

In S604, the MFP which has received the print data sent from the host computer 101 executes printing by use of the print data and counts the number of printed faces under multiple conditions.

If the printing is completed, the MFP 102 issues (transmits) a print completion notification, which indicates a processing result including the multiple conditions (types) of count information of the counted number of printed faces, to the cloud server 103 in S605. In S606, the cloud server 103 determines the charging amount based on the multiple types of count information of the number of printed faces, which is included in the print completion notification issued in S605. Then, the cloud server 103 reflects the charging amount in the Web contents for notifying the user of the charging amount.

The subsequent processing for the user to check the Web contents in S607 to S610 is the same as the example explained in S509 to S512 of FIG. 5, and thus the explanation thereof is omitted here.

Figure 7:
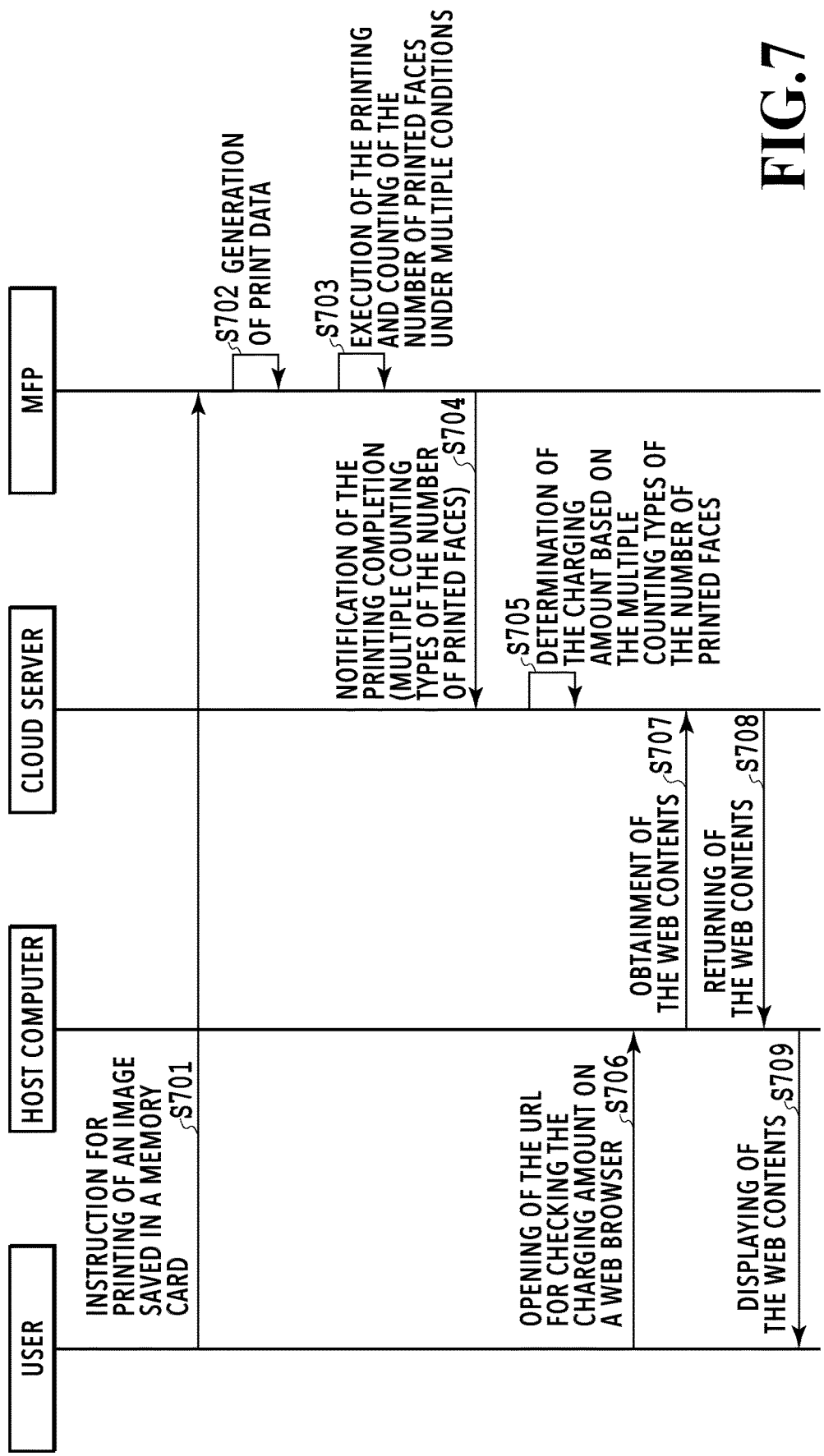
FIG. 7 is a sequence diagram illustrating an example of charge processing for printing.

FIG. 7 is a sequence diagram illustrating another example of charge processing for printing without going through the cloud server 103 in the present embodiment. FIG. 7 is a sequence in a case where the user connects a memory card to the MFP 102 to print image data saved in the memory card with the MFP 102.

In S701, the MFP 102 accepts an instruction for printing image data saved in the memory card from the user. In S702, the MFP 102 reads out the image data designated by the user operation from the memory card and generates print data based on the print settings designated by user operations. In S703, the MFP 102 executes printing by use of the print data and counts the number of printed faces under multiple conditions.

If the printing is completed, the MFP issues (transmits) a print completion notification, which indicates a processing result including the multiple conditions (types) of count information of the counted number of printed faces, to the cloud server in S704. In S705, the cloud server 103 determines the charging amount based on the multiple types of count information of the number of printed faces, which is included in the print completion notification issued in S704. Then, the cloud server 103 reflects the charging amount in the Web contents for notifying the user of the charging amount.

The subsequent processing for the user to check the Web contents in S706 to S709 is the same as the example explained in S509 to S512 of FIG. 5, and thus the explanation thereof is omitted here.

In the example explained with reference to FIG. 7, although the sequence of printing image data stored in a memory card is illustrated as an example of executing printing with the MFP 102 alone, the printing method that can be the target of the charge processing is not limited to this example. Needless to say, it can be applied to general processing of executing printing with the MFP 102 alone, such as copying.

Further, in the examples explained with reference to FIG. 5, FIG. 6 and FIG. 7, the sequence diagrams of the charging services are illustrated as examples of a pay-as-you-go service based on count information of the number of printed faces counted by the MFP 102. However, the present embodiment is not limited to a charging service, and any service is possible as long as it is a service based on the usage amount of the MFP 102.

Further, in the examples explained with reference to FIG. 5, FIG. 6 and FIG. 7, the example in which a Web browser operating on the host computer is used as a method for the user to check the usage amount of the pay-as-you-go service is illustrated. However, the checking of the usage amount may be implemented in various forms. For example, it is also possible that a Web browser is mounted on the MFP 102 so that the user can check the usage amount on the display unit 256 included in the MFP 102. Alternatively, instead of the form of Web contents, it is also possible that the cloud server 103 notifies the host computer 101 or the MFP 102 of the usage amount so that the usage amount is displayed for the user on these apparatuses. Alternatively, the checking of the usage amount can be implemented in given forms.

Processing for Counting the Number of Printed Faces of the MFP

Figure 8:
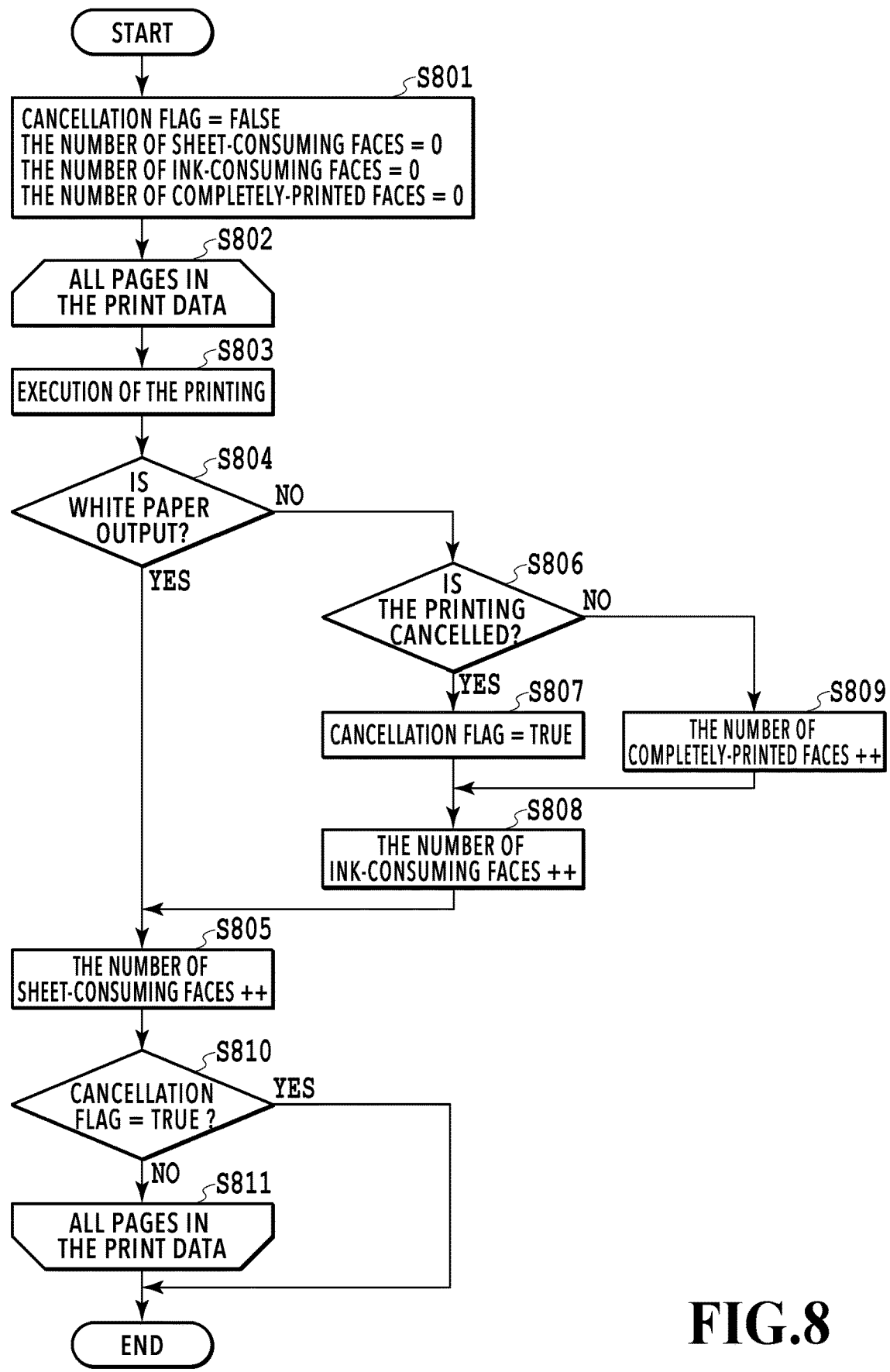
FIG. 8 is a flowchart illustrating an example of processing of counting the number of printed faces.

FIG. 8 is a flowchart illustrating an example of the processing of counting the number of printed faces which is performed by the MFP 102 of the present embodiment. Specifically, the processing executed by the MFP 102 in S506 of FIG. 5, S604 of FIG. 6, and S703 of FIG. 7 is illustrated. The processing illustrated in FIG. 8 is realized by the CPU 250 reading out a program stored in the ROM 253 or the like of the MFP 102 into the RAM 254 and executing the program.

In S801, the MFP 102 firstly sets the cancellation flag, which is used for the control of cancelling the print processing due to a cancellation instruction or an error occurrence, to FALSE. Further, the MFP 102 initializes the three types of counting, i.e., the number of sheet-consuming faces, the number of ink-consuming faces, and the number of completely-printed faces, which are examples of the multiple types of counted numbers of printed faces, to "0". The number of sheet-consuming faces is the number of faces of the output sheets used for printing and is a count representing the consumption amount of the output sheets. As described above, in a case where double-sided printing on the front face and the back face is performed on one sheet, the count is "2". The number of ink-consuming faces is the number of faces on which ink is ejected on the output sheets and is a count representing the consumption amount of ink. The number of completely-printed faces is the number of faces for which the print processing is completed without cancelling in the middle and is a count representing the amount of printed output materials that are valuable to the user. Details of the number of sheet-consuming faces, the number of ink-consuming faces, and the number of completely-printed faces will be explained with reference to FIG. 9, which will be described later.

S802 to S811 are loop processing, in which the MFP 102 repeats the print processing and the processing of counting the number of printed faces for the total number of pages of print data unless there is a cancellation instruction or an error occurrence.

In S803, the MFP 102 executes printing of one page of the print data. In S804, the MFP 102 determines whether white paper is output for the print page of the processing target. In a case where white paper is output, the processing proceeds to S805, so that the MFP 102 counts up the number of sheet-consuming faces only. That is, in the case where white paper is output, ink is not consumed. Further, in the case where white paper is output, a printed output material that is valuable to the user is not output. Therefore, only the number of sheet-consuming faces is counted up. In a case where white paper is not output, the processing proceeds to S806.

In S806, the MFP 102 determines whether the printing is cancelled on the print page of the processing target due to a cancellation instruction or an error occurrence. In a case where the printing is cancelled, the processing proceeds to S807, so that the cancellation flag is set to TRUE. Then, the processing proceeds to S808, so that the number of ink-consuming faces is counted up. Then, the processing proceeds to S805, so that the number of sheet-consuming faces is also counted up. That is, in a case where the output is not white paper and the printing is cancelled, the print processing that consumes ink is performed for a partial area of the print page of the processing target. Therefore, both the number of ink-consuming faces and the number of sheet-consuming faces are counted up.

On the other hand, in a case where the printing is not cancelled in S806, the processing proceeds to S809, so that the MFP 102 counts up the number of completely-printed faces. Then, the processing proceeds to S808 and S805. That is, in a case where the output is not white paper and the printing is not cancelled, the printing is normally completed on the print page of the processing target. Therefore, the number of completely-printed faces, the number of ink-consuming faces, and the number of sheet-consuming faces are all counted up, respectively.

If the processing of S805 ends, the processing proceeds to S810, so that the MFP 102 determines whether the cancellation flag is TRUE. If the cancellation flag is TRUE, the print page of the processing target has not been properly completed, and thus the print processing based on the print data ends at this point in time. That is, the processing of the present flowchart ends. On the other hand, in a case where the cancellation flag is FALSE, the processing proceeds to S811, so that whether the processing of all pages of the print data is completed is determined. In a case where the processing of all pages has ended, the processing of the present flowchart ends. In a case where there is an unprocessed page, the processing returns to S802, so that the processing is repeated.

In this way, the MFP 102 counts the usage amount of the MFP 102 under the multiple conditions (multiple types).

Figure 9:
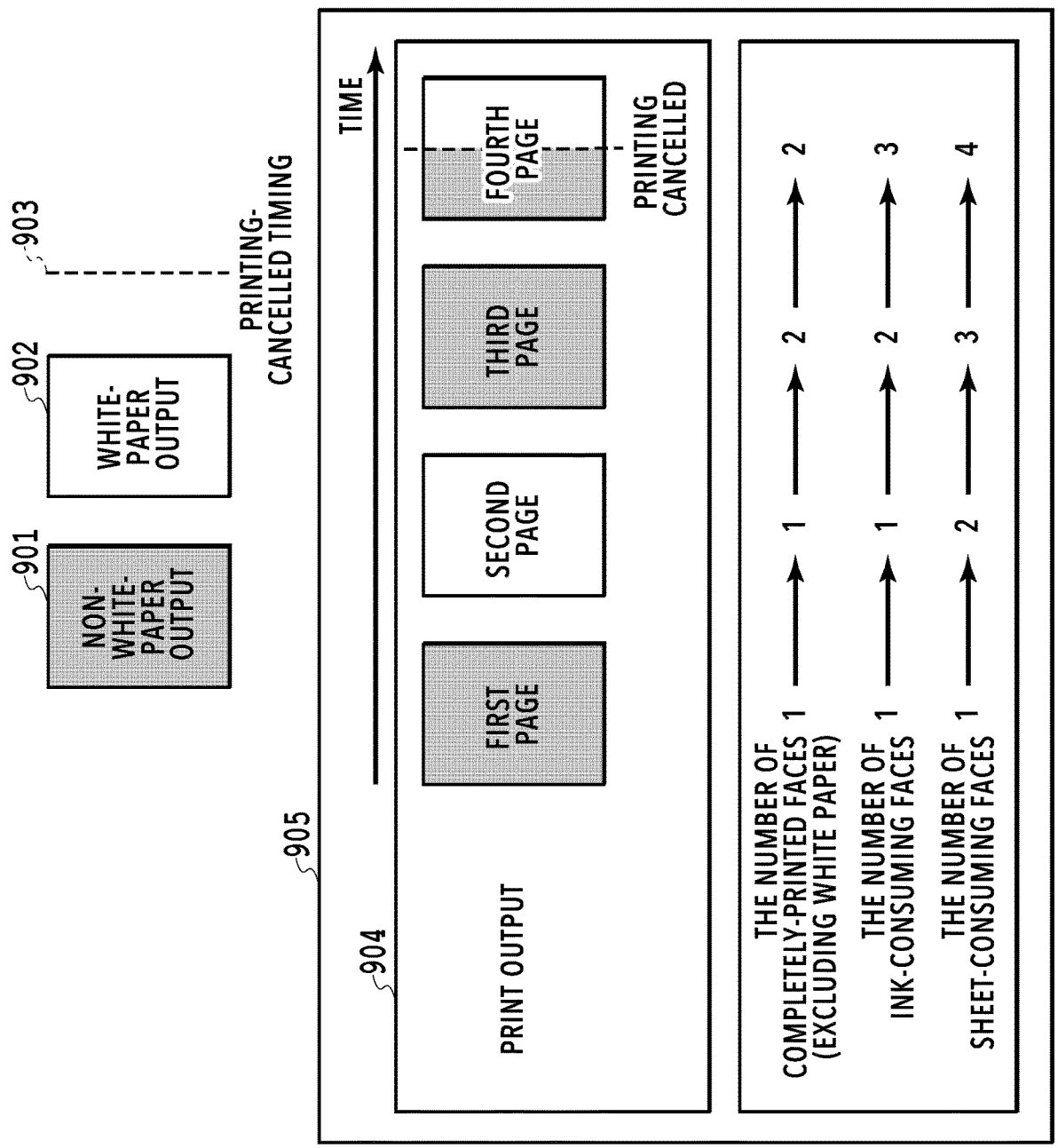
FIG. 9 is a diagram for explaining an example of multiple types of counted numbers of printed faces.

Multiple Types of Counted Numbers of Printed Faces in the Printing Apparatus FIG. 9 is a diagram for explaining an example of multiple types of counted numbers of printed faces in the present embodiment. With reference to FIG. 9, an explanation will be given of the relationship of the number of sheet-consuming faces, the number of ink-consuming faces, and the number of completely-printed faces in the present embodiment. The multiple types of counted number of printed faces used in the present embodiment are multiple types of counts that concurrently count up under predetermined conditions.

In FIG. 9, the symbols of the non-white-paper output 901, the white-paper output 902, and the printing-cancelled timing 903 are used to illustrate the specific example as to how the number of sheet-consuming faces, the number of ink-consuming faces, and the number of completely-printed faces are counted up based on the print output result.

The print output result 904 indicates an example of a result of the print output processing based on print data. In the present example, printing is completed from the first page to the third page. However, the second page is a white-paper output. Further, printing of the fourth page is cancelled due to a cancellation instruction or an error occurrence.

The count result 905 indicates how the number of sheet-consuming faces, the number of ink-consuming faces, and the number of completely-printed faces are counted up with the progress of the print output result 904.

First, the count-up of the number of completely-printed faces will be explained. In the present embodiment, an explanation will be given of the example in which a charging service is applied to the cloud server 103 as a pay-as-you-go service based on information of the number of printed faces counted by the MFP 102. Considering the nature of the charging service, such an operation in which the cloud server 103 uses the number of completely-printed faces as the number of printed faces that are valuable to the user so that the user does not suffer a disadvantage may be performed. In this way, the number of completely-printed faces can be used for such a purpose as checking the number of printed faces that are valuable to the user.

In the count result 905, a result in a case where the number of completely-printed faces is the number of printed faces that are valuable to the user and where the white-paper output pages are excluded from the counting target of the number of completely-printed faces is illustrated. That is, the number of completed non-white-paper output pages is counted as the number of completely-printed faces. Therefore, in the print output result 904, since the completed non-white-paper output pages are the first page and the third page, the count number of the number of completely-printed faces is "2".

Next, the number of ink-consuming faces will be explained. For example, if a print charging service is implemented on a printing apparatus whose ink cost is high, such an operation in which the number of ink-consuming faces is used instead of the number of completely-printed faces in order to determine the usage amount of the printing apparatus may be performed.

Alternatively, in a case where it is desired to apply the information of the numbers of printed faces counted by the MFP 102 not only to a charging service but also to a point-granting service, such an operation in which the numbers of printed faces are selectively used depending on the services so that the user does not suffer a disadvantage may also be performed. For example, it is also possible that the usage amount of the printing apparatus for the print charging service is determined based on the number of completely-printed faces and the usage amount of the printing apparatus for the point-granting service is determined based on the number of ink-consuming faces. In this way, by selectively using the number of completely-printed faces and the number of ink-consuming faces according to the natures of the services and the costs of ink and paper used by the printing apparatus, it is possible to realize services preferable for both the service providers and the users.

The number of ink-consuming faces is counted as the number of pages excluding white-paper output pages. Even on a page whose printing was cancelled, ink is consumed unless the page is a white-paper output. Therefore, in the print output result 904, the count number of the number of ink-consuming faces is "3".

Next, the number of sheet-consuming faces will be explained. For example, for the purpose of securing the profit of a service provider implementing a print charging service, such an operation in which the usage amount of the printing apparatus is determined by using the number of sheet-consuming faces instead of the number of completely-printed faces under the print setting where high-cost output paper is used may be performed.

The number of sheet-consuming faces is counted as the total number of pages including white-paper output pages. Therefore, in the print output result 904, the count number of the number of sheet-consuming faces is "4".

In the present embodiment, the above-described various types of count numbers will have the same count results regardless of whether single-sided printing or double-sided printing is performed on the MFP 102. For example, in the case of performing double-sided printing, the number of sheets required for the print output illustrated in the print output result 904 is 2, but the number of sheet-consuming faces is "4". As described above, in the present embodiment, the example of counting the number of faces on which the print processing is executed is illustrated, instead of counting on a per output sheet basis. In a case where it is desired to determine the usage amount of the printing apparatus based on the number of output sheets, the determination may be made based on the print settings indicating whether single-sided printing or double-sided printing is performed and the number of sheet-consuming faces. Further, this determination may be made by the MFP 102 or on the cloud server 103 side that receives information of the print settings.

In the present embodiment, the explanation has been given of the example in which the number of completely-printed faces, the number of ink-consuming faces, and the number of sheet-consuming faces are used as the multiple counted numbers of printed faces in the printing apparatus. Here, as indicated in FIG. 9, these counted numbers of printed faces are also expressed by a combination of "the number of completely-printed faces excluding white-paper outputs", "the number of white-paper output faces", and "the number of printing-cancelled faces with ink ejection". The details are as shown in the following formulas (1) to (3).

$$\text{Number of completely-printed faces} = \text{Number of completely-printed faces excluding white-paper outputs} \quad (1)$$

$$\text{Number of ink-consuming faces} = \text{Number of completely-printed faces excluding white-paper outputs} + \text{Number of printing-cancelled faces with ink ejection} \quad (2)$$

$$\text{Number of sheet-consuming faces} = \text{Number of completely-printed faces excluding white-paper outputs} + \text{Number of printing-cancelled faces with ink ejection} + \text{Number of white-paper output faces} \quad (3)$$

In this way, the formulas (1) to (3) hold. Therefore, the same result can be obtained even if the MFP 102 notifies the cloud server 103 of the three count values of the number of faces, i.e., "the number of completely-printed faces excluding white-paper outputs", "the number of white-paper output faces", and "the number of printing-cancelled faces with ink ejection". Note that the number of sheets can be counted instead of the number of faces as well. That is, it is also possible to count "the number of completely-printed sheets excluding white-paper outputs", "the number of white-paper output sheets", and "the number of printing-cancelled sheets with ink ejection" and transmit the count values from the MFP 102 to the cloud server 103. That is, it is also possible that the counts indicating "the number of complete prints excluding white-paper outputs", "the number of white-paper outputs", and "the number of cancelled prints with ink ejection" are transmitted from the MFP 102 to the cloud server 103.

Although the MFP 102 (printing apparatus) is assumed to be a printer in an inkjet scheme and the term "number of ink-consuming faces" is used in the present embodiment, it is also possible that a printer in another scheme such as a printer of an electrophotographic method is used. In a case of using a printer of an electrophotographic method, the number of toner-consuming faces may be counted.

Flowchart of the Charge Processing on the Cloud Server 103

Figure 10:
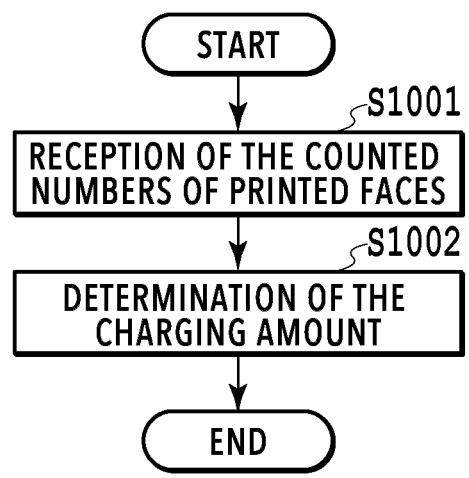
FIG. 10 is a flowchart illustrating charge processing.

FIG. 10 is a flowchart illustrating charge processing on the cloud server 103 (the charge processing server 500) in the present embodiment. Specifically, the processing executed by the charge processing unit 604 of the cloud server 103 in S508 of FIG. 5, S606 of FIG. 6, and S705 of FIG. 7 is illustrated. The flowchart of FIG. 10 is realized by the CPU 301 of the charge processing server 500 reading out a program stored in the ROM 303 or the like into the RAM 302 and executing the program.

In S1001, the charge processing unit 604 receives the multiple types of counted numbers of printed faces, which are notified by the MFP 102 to the cloud server 103. For example, as explained with reference to FIG. 9, the count values capable of identifying the number of completely-printed faces, the number of ink-consuming faces, and the number of sheet-consuming faces are received.

In S1002, the charge processing unit 604 determines the charging amount, based on the received multiple types of counted numbers of printed faces. Here, as a form of determining the charging amount based on multiple types of counted numbers of printed faces, various forms can be adopted according to the service. Therefore, for example, it is also possible to determine the types of counted numbers of printed faces to be used for the respective services in advance.

For example, in the present embodiment, an application example to a charging service is shown. Therefore, the charging amount may be set based on the number of completely-printed faces which are print outputs that are valuable to the user. If the charging amount is based on the number of completely-printed faces, the user can calculate the charging amount before printing, so that the charging system can be easily understood by the user. Alternatively, the charging amount may be determined by use of the number of ink-consuming faces and the number of sheet-consuming faces, based on the cost of consumables used by the printing apparatus, that is, ink and output sheets.

Further, the charging amount may be determined by selectively using the number of completely-printed faces, the number of ink-consuming faces, and the number of sheet-consuming faces according to the cost of the consumables used by the printing apparatus. By doing so, it is possible to realize services preferable for both the service providers and the users. This case will be explained later with reference to FIG. 11 as an example of charge processing.

As described above, various forms are conceivable for selectively using multiple types of counted numbers of printed faces. In general, if printing is performed with a printing apparatus, color printing consumes more ink than monochrome printing. Further, glossy paper is more expensive than plain paper. Therefore, for determining the charging amount based on the counted numbers of printed faces, the unit price to be multiplied to the counted numbers of printed faces may be switched according to the print settings such as color printing, monochrome printing, plain paper, or glossy paper. Further, as a pay-as-you-go service, a point-granting service is conceivable instead of a charging service. In a case of being applied to a point-granting service, it is also possible to design the points to be granted based on the number of ink-consuming faces and the number of sheet-consuming faces, so that points are added based on the consumption amounts of consumables.

In this way, the selection of multiple types of counts or the usage with a combination thereof is set in advance in association with the service to be provided. Further, the setting for such association can be appropriately changed on the cloud server 103 side. For example, it is also possible that the charge processing unit 604 determines whether to change the charging setting before implementing the processing of the flowchart of FIG. 10, and, in a case of changing the settings, the processing illustrated in FIG. 10 is implemented by use of the counted numbers of printed faces corresponding to the change. For example, the charging setting is changed by the service provider.

Figure 11:
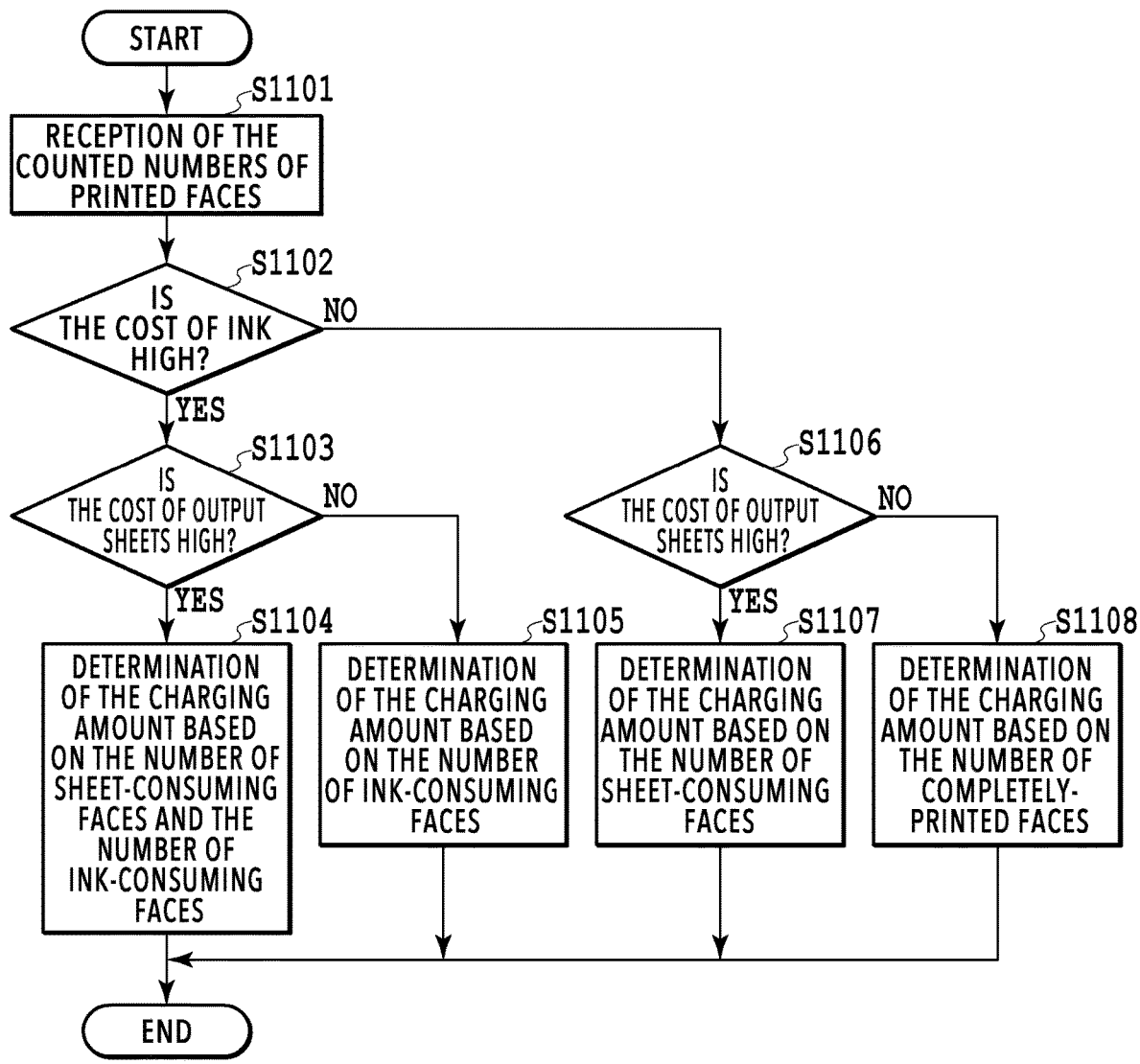
FIG. 11 is a flowchart illustrating charge processing.

FIG. 11 is a flowchart illustrating charge processing on the cloud server 103 (the charge processing server 500) in the present embodiment. Specifically, as with FIG. 10, the processing executed by the charge processing unit 604 of the cloud server 103 in S508 of FIG. 5, S606 of FIG. 6, and S705 of FIG. 7 is illustrated. The flowchart of FIG. 11 is realized by the CPU 301 of the charge processing server 500 reading out a program stored in the ROM 303 or the like into the RAM 302 and executing the program. FIG. 11 shows the example of executing the charging by selectively using the number of completely-printed faces, the number of ink-consuming faces, and the number of sheet-consuming faces according to the cost of the consumables used by the printing apparatus.

In S1101, the charge processing unit 604 receives the multiple types of counted numbers of printed faces, which are notified by the MFP 102 to the cloud server 103. Next, a determination to determine the charging amount based on at least one of the number of sheet-consuming faces and the number of ink-consuming faces is made in S1102, S1103, and S1106.

First, in S1102, the charge processing unit 604 determines whether the MFP 102 (printing apparatus) used by the user is a printing apparatus with high ink cost. For example, by determining the first threshold value in advance, in a case where the ink cost is higher than the first threshold value, it is determined that the MFP 102 is a printing apparatus with high ink cost.

In a case where the cost of ink is high, the processing proceeds to S1103, so that the charge processing unit 604 determines the charging amount in consideration of the number of ink-consuming faces in the subsequent processes.

In a case where the cost of ink is low, the processing proceeds to S1106, so that the charging amount is determined without considering the number of ink-consuming faces in the subsequent processes.

In S1103, the charge processing unit 604 determines whether the cost of the output sheets used for printing is high. For example, by determining the second threshold value in advance, in a case where the cost of the output sheets is higher than the second threshold value, it is determined that the cost of the output sheets is high. In a case where the cost of the output sheets is high, the processing proceeds to S1104, so that the charge processing unit 604 determines the charging amount based on the number of sheet-consuming faces and the number of ink-consuming faces. In a case where the cost of the output sheets is low, the processing proceeds to S1105, so that the charge processing unit 604 determines the charging amount based on the number of ink-consuming faces.

In S1106, whether the cost of the output sheets used for printing is high is determined. This determination is the same as the determination of S1103. In a case where the cost of the output sheets is high, the processing proceeds to S1107, so that the charge processing unit 604 determines the charging amount based on the number of sheet-consuming faces. In a case where the cost of the output sheets is low, the processing proceeds to S1108, so that the charge processing unit 604 determines the charging amount based on the number of completely-printed faces.

As explained above, according to the present embodiment, it is possible to attend to various services according to the number of prints of a printing apparatus. The charge processing illustrated in FIG. 10 and FIG. 11 is implemented in a cloud computing environment. Therefore, in various services, it is possible to change and adjust the charge processing in consideration of the cost to be imposed on providing a service that is dependent on consumables, etc., only by changing software on the cloud server 103 side. That is, it is possible to change the charge processing according to the usage amount of a printing apparatus without updating the software of the printing apparatus. Therefore, even if it becomes necessary to change the method of determining the charging amount for some reason such as the difference in the costs of consumables between printing apparatuses and the fluctuation of the costs of consumables, it is possible to attend to the necessity only with an update of the charge processing on the cloud side. Therefore, it is possible to realize a configuration in which changes of the charge processing can be easily applied at an intended timing without causing a load for managing the update status of a large number of printing apparatuses.

Further, in FIG. 10 and FIG. 11, the flowcharts in the case where the present embodiment is applied to a charging service are shown as examples of a pay-as-you-go service based on multiple types of count information of the numbers of printed faces, which are counted by the MFP 102. However, the present embodiment is not limited to the charging service and can be applied to any service that is based on the usage amount of a printing apparatus. In a case where the processing explained in the present embodiment is applied to a service different from the charging service, a processing unit for determining the usage amount based on the nature of the service or the cost of consumables may be installed for the determination processing.

Second Embodiment

In the first embodiment, the explanation was given of the example of executing the charge processing based on the usage amount of the printing apparatus on the cloud environment side. Further, in the first embodiment, the explanation was also given of the example in which there may be a service form where the charging amount is determined based on the consumption amount of consumables in a case where the cost of ink or output sheets used by the printing apparatus is high. Generally, in a case where the charging amount is determined based on the consumption amount of consumables, the charging target includes the pages whose printing is cancelled due to the user's cancellation instruction or an error occurrence.

However, in a case where printing is cancelled due to an event that is not the responsibility of the user, such as a power outage, it is desirable to exclude the page from the charging target. Therefore, in the present embodiment, an explanation is given of the example in which, in a case where printing is cancelled due to an event that is not the responsibility of the user, the page is excluded from the charging target. If it is possible to identify the printing apparatus whose operation was disturbed by an event that is not the responsibility of the user and the time of the disturbance, the user and the print job whose printing was cancelled due to the event can be identified, and the job or the page can be excluded from the charging target.

Figure 12:
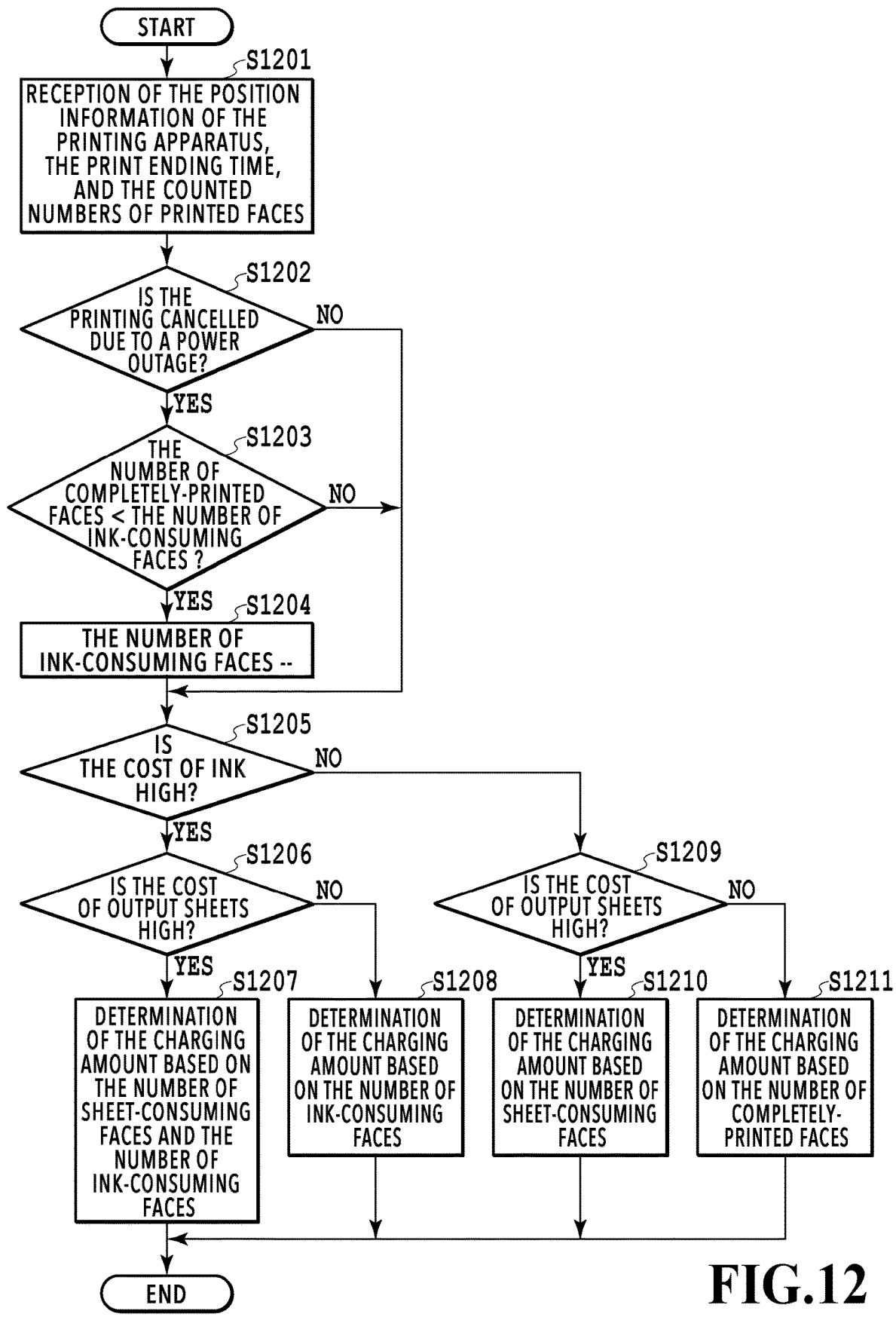
FIG. 12 is a flowchart illustrating charge processing.

FIG. 12 is a flowchart illustrating charge processing on the cloud server 103 (the charge processing server 500) in the present embodiment. Specifically, the processing executed by the charge processing unit 604 of the cloud server 103 in S508 of FIG. 5, S606 of FIG. 6, and S705 of FIG. 7 is illustrated. FIG. 12 shows an example of the charge processing in which, by use of information of power outage occurrence area, the amount corresponding to the cancelled pages is reduced from the charging amount of the print job that is cancelled due to the power outage. FIG. 12 is a flowchart based on the processing of selectively using the number of completely-printed faces, the number of ink-consuming faces, and the number of sheet-consuming faces according to the cost of the consumables used by the printing apparatus, which is shown in FIG. 11.

In the present embodiment, it is assumed that the print completion notification which is notified from the MFP 102 to the cloud server 103 includes the position information indicating the installation position of the MFP 102, the print ending time, and the multiple types of counted numbers of printed faces. Here, Global Positioning System (hereinafter referred to as GPS) may be used as the position information. As the print ending time, the current time is periodically stored in the non-volatile RAM 255 in the MFP 102 from the start to the end of printing. Accordingly, even if the power is suddenly turned off due to a power outage or the like during printing, a rough print ending time can be left. Further, in the present embodiment, it is assumed that the cloud server 103 appropriately receives information related to the power outage occurrence area and its occurrence time via the Internet.

In S1201, the charge processing unit 604 of the cloud server 103 receives the print completion notification including the position information of the MFP 102 notified by the MFP 102 to the cloud server 103, the print ending time, and the multiple types of counted numbers of printed faces.

Next, in S1202, the charge processing unit 604 collates the information of the power outage occurrence area and the occurrence time stored in advance, the position information of the MFP 102 received from the MFP 102, and the print ending time. Then, whether or not there is a possibility that the printing of the job has been cancelled due to the power outage is determined. If it is determined that the cancellation of the printing has occurred due to the power outage, the processing proceeds to S1203, and, if not, the processing proceeds to S1205.

In S1203, the charge processing unit 604 confirms whether the number of ink-consuming faces is larger than the number of completely-printed faces. In a case where the number of ink-consuming pages is equal to the number of completely-printed faces, it can be determined that the power outage does not affect the print output. On the other hand, in a case where the number of ink-consuming pages is larger than the number of completely-printed faces, it is determined that there is a face whose printing was cancelled in the middle of the page due to the power outage. Therefore, in a case where the number of ink-consuming faces is larger than the number of completely-printed faces, the processing proceeds to S1204, so that the charge processing unit 604 subtracts "1" from the number of ink-consuming faces. Accordingly, the face whose printing has been cancelled is excluded from the charging target. In this example, although the processing of uniformly subtracting "1" from the number of ink-consuming faces is shown as a simple example, it is also possible that, in a case of double-sided printing, "1" is subtracted if the cancellation is executed during front side printing and "2" is subtracted if the cancellation is executed during back side printing. Accordingly, a more preferable result can be obtained. Thereafter, the processing proceeds to S1205.

The processing after S1205 is the same as the processing of FIG. 11. That is, S1205 to S1211 are the same processes as S1102 to S1108 of FIG. 11, respectively.

In a case where a power outage occurs during printing by the MFP 102, the communication between the MFP 102 and the cloud server 103 is also disconnected. The print completion notification is issued from the MFP 102 to the cloud server 103 after the power outage is resolved, the MFP 102 starts up, and the network communication with the cloud server 103 is successfully reconnected. Therefore, there is a certain amount of time from the end of the print processing of the MFP 102 to the notification of the printing completion notification to the cloud server 103. If the cloud server 103 can collect the information related to the power outage within the time until the print completion notification is provided, the processing of reducing the charging amount can be immediately performed by the flow of FIG. 12. If the information related to the power outage cannot be collected in time by the time of the execution of the charge processing, the history of the print completion notification and the charging amount is retained on the cloud server 103 for a certain period of time. Then, if the cloud server 103 obtains the power outage information, the power outage information may be compared with the print history in order to identify the printing for which the reduction processing could not be executed, so that cash back or the like will be provided for the user who suffered the disadvantage.

As explained above, according to the processing of the present embodiment, in a case where printing is cancelled due to an event that is not the responsibility of the user, such as a power outage, the page can be excluded from the charging target. Although the power outage was explained as an example in the present embodiment, it is also possible that an event that is not the responsibility of the user is specified by use of information such as a trouble of the printing apparatus.

Other Embodiments

In the explanation of the above-described embodiments, the number of sheet-consuming faces, the number of ink-consuming faces, and the number of completely-printed faces are taken as the example of the multiple types of counts that indicate the usage amount of the MFP 102. However, it is sufficient as long as multiple types of counts are used, and such a form in which at least two of these three are used is also possible. Further, counting types other than these may be used. Further, instead of the number of faces, it is also possible to use the number of sheets as the references, i.e., the number of consumed sheets, the number of ink-consuming sheets, and the number of completely-printed sheets. In this case, as described above, an appropriate counting can be used if being used in combination with the print setting information of single-sided printing or double-sided printing as appropriate.

Further, as described above, the number of ink-consuming faces or the number of ink-consuming sheets is an example counted by the MFP 102 of an inkjet scheme. Therefore, it is also possible to count the number of colorant-consuming faces or the number of colorant-consuming sheets, on which colorants are printed on the sheets.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printing system including a printing apparatus and a server system configured to receive a processing result of processing performed by the printing apparatus,
wherein the printing apparatus comprises a notification unit configured to notify the server system of the processing result, which includes a plurality of types of counts that indicate the number of prints generated by execution of print processing in the printing apparatus and that concurrently count up under predetermined conditions, wherein the server system comprises a processing unit configured to provide a service based on the plurality of types of counts included in the processing result, wherein the processing unit is configured to provide the service based on counts which are a combination of at least two types of counts from among the plurality of types of counts, and wherein the combination of the types of counts is set in advance in association with the service.

2. The printing system according to claim 1, wherein the plurality of types of counts indicating the number of prints include at least two of the number of sheet-consuming faces which indicates the number of faces in output sheets, the number of colorant-consuming faces which indicates the number of faces on which colorant is used in the output sheets, and the number of completely-printed faces which indicates the number of faces on which print processing is completed without being cancelled in the middle.

3. The printing system according to claim 1, wherein the plurality of types of counts indicating the number of prints includes at least two of the number of consumed sheets which indicates the number of output sheets, the number of ink-consuming sheets which indicates the number of output sheets on which ink is ejected, and the number of completely-printed sheets which indicates the number of sheets on which print processing is completed without being cancelled in the middle.

4. The printing system according to claim 1, wherein, in a case where the print processing is cancelled in the middle of printing without a user's intention, the processing unit is configured to provide the service based on a processing result excluding counts of the number of cancelled prints.

5. The printing system according to claim 1, wherein the processing unit is configured to select one of the plurality of types of counts so as to provide the service based on the selected type of count.

6. The printing system according to claim 5, wherein the selection of the one type of count is set in advance in association with the service.

7. The printing system according to claim 5, wherein, in a case where a target service is changed, the processing unit is configured to change the selected type of count.

8. The printing system according to claim 1, wherein, in a case where a target service is changed, the processing unit is configured to change the combined types of counts.

9. The printing system according to claim 1, wherein the processing unit is configured with a charging unit configured to provide a charging service.

10. The printing system according to claim 1, wherein the processing unit is configured with a granting unit configured to provide a service that grants a point.

11. A server system configured to communicate with a printing apparatus, the server system comprising:

a memory containing instruction; and a processor for executing the instructions to receive a processing result from the printing apparatus, the processing result including a plurality of types of counts that indicate the number of prints generated by execution of print processing in the printing apparatus and that concurrently count up under predetermined conditions; and provide a service based on the plurality of types of counts included in the processing result, wherein the service is provided based on counts which are a combination of at least two types of counts from among the plurality of types of counts, and wherein the combination of the types of counts is set in advance in association with the service.

12. A control method of a server system configured to communicate with a printing apparatus, the control method comprising:

receiving a processing result from the printing apparatus, the processing result including a plurality of types of counts that indicate the number of prints generated by execution of print processing in the printing apparatus and that concurrently count up under predetermined conditions; and performing processing to provide a service based on the plurality of types of counts included in the processing result;

wherein the service is provided based on counts which are a combination of at least two types of counts from among the plurality of types of counts, and wherein the combination of the types of counts is set in advance in association with the service.

* * * * *